INVENTOR.
LEWIS C. ERICKSON
BY
Richard P. Cardew
AGENT

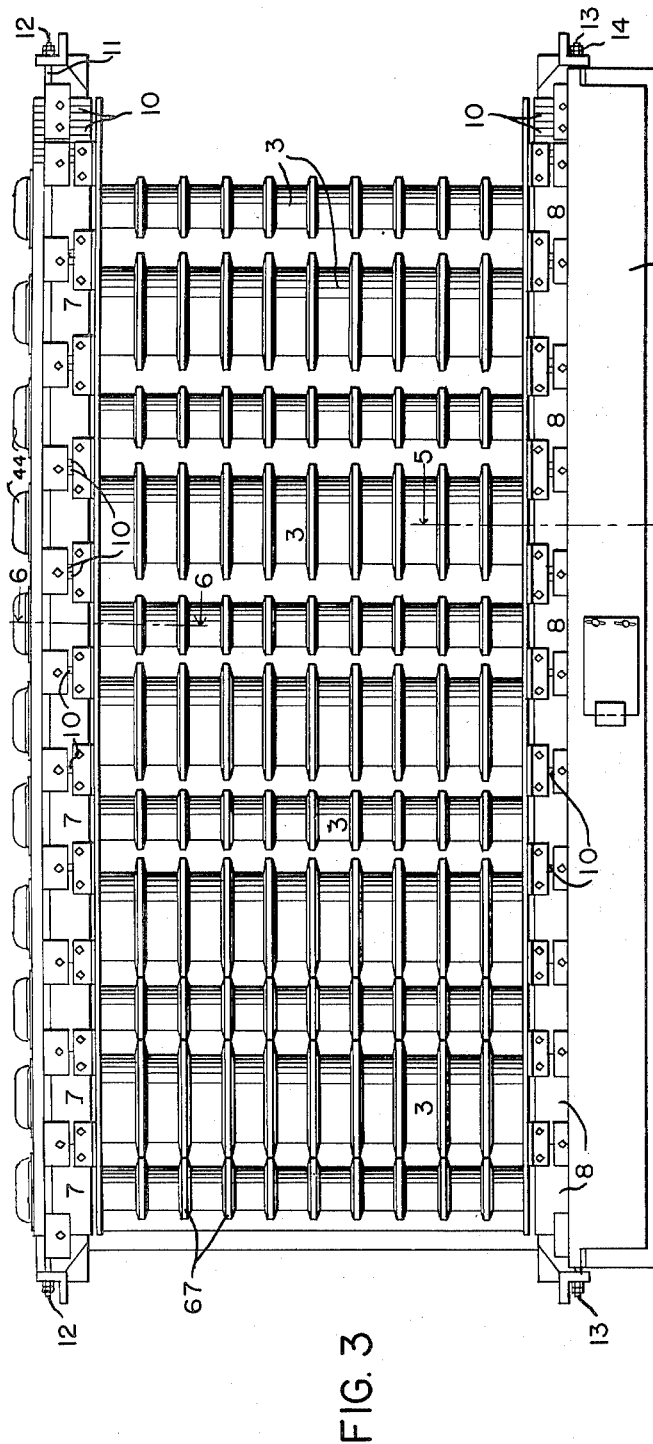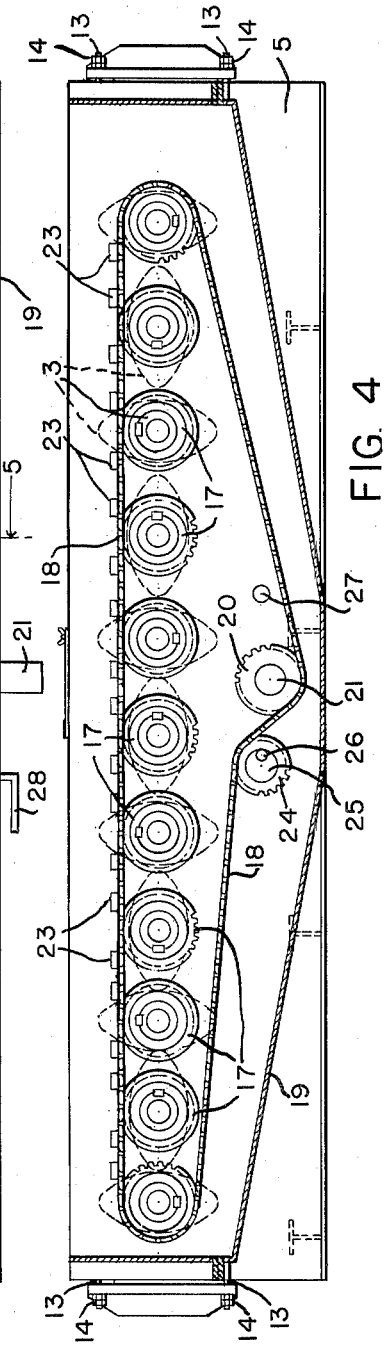
FIG. 3
FIG. 4
INVENTOR.
LEWIS C. ERICKSON
BY
Richard P. Cardew
AGENT May 1, 1956    L. C. ERICKSON    2,743,813
MATERIALS SEPARATING MEANS
Filed April 25, 1951    7 Sheets-Sheet 4
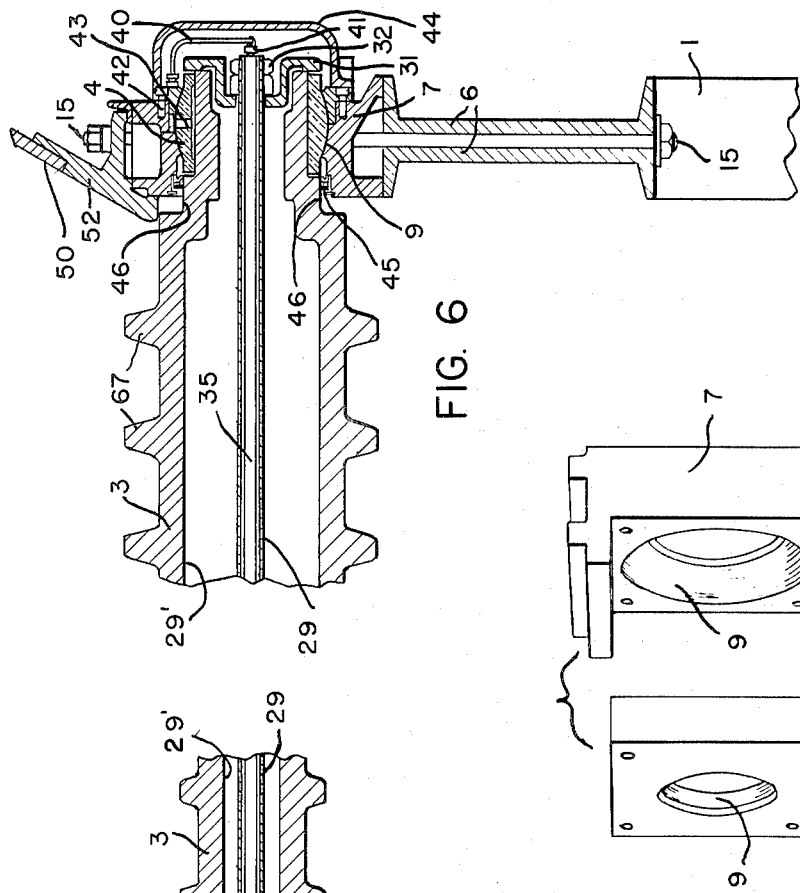
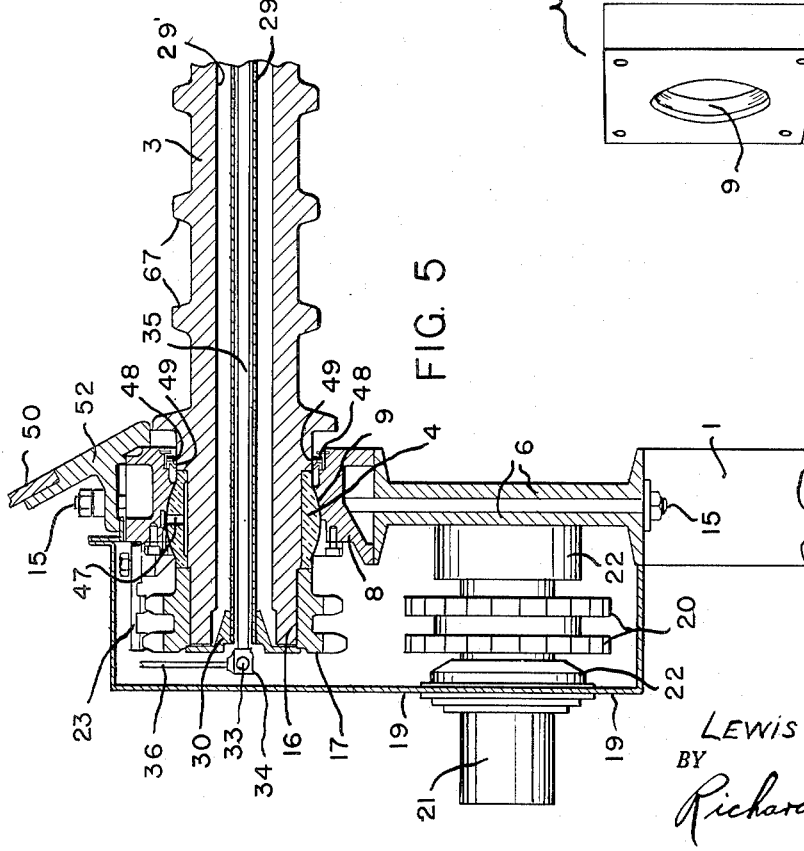
INVENTOR.
LEWIS C. ERICKSON
BY
Richard P. Cardew
AGENT May 1, 1956 L. C. ERICKSON 2,743,813
MATERIALS SEPARATING MEANS
Filed April 25, 1951 7 Sheets-Sheet 5

May 1, 1956  L. C. ERICKSON  2,743,813
MATERIALS SEPARATING MEANS
Filed April 25, 1951  7 Sheets-Sheet 7

INVENTOR.
LEWIS C. ERICKSON
BY
Richard P. Cardew
AGENT

United States Patent Office 2,743,813
Patented May 1, 1956

2,743,813

MATERIALS SEPARATING MEANS

Lewis C. Erickson, Duluth, Minn., assignor of twenty-five per cent to Lester E. Erickson, twenty-five per cent to Carl Erickson, and twenty-five per cent to Charles Eisenberg Application April 25, 1951, Serial No. 222,779

10 Claims. (Cl. 209—106)

This invention relates to materials separation or sizing generally and more particularly to the separation of oversize particles from mine run ores.

Broadly, the invention provides apparatus well suited to the sizing of many types of materials, but for purposes of disclosure, a preferred embodiment will be described in connection with the removal of oversize particles from open pit mine run iron ore.

Open pit iron mining operations produce earth, clay, ore, and rock in particle sizes varying from an earthy texture to large boulders. A portion of these materials as removed by the digging operation are oversize; that is, they are too large to be handled by the conveyors customarily employed for removing the ore from the pits. A number of solutions to the problem of removing these oversize particles have been proposed and are in use.

One type of separator is the so-called grizzly which comprises a series of bars arranged to have a fixed opening between adjacent bars for passing particles of allowable size, oversize particles being retained by the bars. The grizzly bars may be stationary, vibrating, or rotary. The grizzly must be inclined to the horizontal so that material can cascade downwardly over the bars or rolls, which cascading sifts fine particles through the bars as the ovesize particles tumble downwardly over the bars. The degree of inclination that is required varies from 35 to 45 degrees for the stationary bar grizzly to 15 degrees or more for the rotary or roll grizzly. The angular inclination of grizzlies makes them a self-cleaning device; that is, they normally discharge all of the oversize particles when the feed of materials is stopped.

A grizzly becomes inoperative if too large a quantity of material is supplied to it because the bed becomes choked and materials on top pass over the grizzly in a waterfall fashion without being screened. For this reason it is necessary to meter the flow of materials to the grizzly by a feeding device. The customary structure utilized for this purpose is an apron conveyor or feeder.

The apron feeder is essentially a conveyor belt made up of a plurality of metallic plates pivotally connected together as an endless belt. These feeders are very expensive and heavy pieces of machinery and there is a great deal of loss of horsepower in their operation, as a considerable amount of power is expended in driving the empty feeder in addition to the power required to convey the load. The feeder serves only to move the material from a chute or hopper where it is placed as it is dug to the screening device that removes oversize particles.

A second type of screening device in common use is the vibrating or oscillating screen, the usual embodiment of which comprises an oscillating deck having openings through which fine materials may pass. The screen, like the grizzly, is not self feeding and, therefore, must be inclined to the horizontal so that materials will pass thereover. The vibrating screen also must be fed a metered supply of materials in order to prevent choking and the resultant cascade of fine materials over the top of the choked bed without being separated from the oversize particles. The usual feeder for supplying the metered quantity of material to the screen is the apron feeder previously mentioned.

Both grizzlies and screens have common disadvantages. Because they must be inclined to the horizontal, a supporting structure must be provided to give the necessary headroom. An apron feeder must be mounted at or above the elevation of the top of the screen or grizzly, increasing further the supporting structure and headroom requirements. Since the digging of ore is a batch operation and the removal of oversize particles is a continuous operation, a storage device or hopper is placed above the feeder in order to serve as an accumulator ahead of the feeder. The combination of hopper, feeder, and screen or grizzly thus becomes an imposing structure often towering fifty feet above the floor of the open pit mine. It is customary to provide an inclosure around all of the apparatus, an item of considerable expense for a fifty foot structure. Further, means must be provided for emptying the material into the top of the hopper, which means is almost invariably large trucks shuttling between the digging shovel and the oversize separator. A roadway must be built for these trucks to reach the top of the hopper from the floor of the mine pit, another item of considerable expense.

Clayey materials are often encountered in excavating iron ore. Neither the grizzly nor the vibrating screen can successfully pass clay, as it is a characteristic of both of these devices to "pancake" or uniformly choke when clay is encountered. This pancaking renders the separator completely inoperative and may necessitate shutting down the operation until the clay is removed.

There is still a further problem in materials separation apparatus, and that is in the loading of the separated or screened material onto a conveyor belt on which it is transported to a remote point for loading, storage, or further processing. Belts utilized in the conveying of ores in the mining industry must be heavy duty and of high quality to minimize breakdowns and costly work interruptions. The initial cost of the belt used in an ore conveyor installation may represent a large portion of the total cost of the installation and is, therefore, very expensive to replace. Damage to the belt, then, is an important consideration.

In loading a belt, as from a separating device, the material drops onto the belt and must be accelerated to move at the speed of the belt. Obviously, when large or jagged pieces of material are dropped onto the belt, they may gouge the surface of the belt before they are fully accelerated. Repeated gouging will render a belt very vulnerable to breakage and may necessitate a shutdown while the belt is repaired.

It is well known that fines, when dropped on a belt, accelerate more readily and with least detrimental effect to the belt than larger particles, and that if a bed or layer of fines could be laid on the belt before the larger particles are dropped thereon, the fines will act as a cushion and greatly reduce belt damage from larger particles. The layer of fines also assists in accelerating the larger particles to the speed of the belt. However, the above described separating devices cannot control the deposit of material on the belt to the extent that the desired layer of fines can be laid before larger particles are dropped on the belt.

It is, therefore, one of my principal objects to provide a materials separation device which overcomes the above-mentioned disadvantages, said device comprising a combined materials separating apparatus and hopper, said separating apparatus functioning as the bottom of the hopper.

Another object is to provide a single operating unit which will replace the apron feeder and the inclined vibrating screen or grizzly, thereby reducing materially the head space required for materials separating operation, and thereby reducing materially the expense of the separating plant.

A further object is to provide a materials separator which will pass clayey substances without choking or pancaking.

Another object is to provide a new mode of operation for a materials separation device.

Another object is to provide a materials separating means which is less expensive in first cost than other separating means and which is less expensive to operate.

Another object is to provide such a device which can be made to any desired length or width, and which can be made to withstand both the impact of large quantities of material being dumped onto same, and also to support the weight of a large quantity of material to be separated.

Another object is to provide such a device which forms the bottom of a materials receiving and/or storing hopper and which has relatively slowly revolving mechanical elements to cause the materials separation operation with no vibration and with relatively little horsepower applied thereto.

Another object is to provide such a device which will be relatively less expensive to maintain than present screening devices through the elimination of down or out of service time. Also, a device is provided which causes no excess or unexpected vibration or stress to the supporting structure.

Another object is to provide such a device with means whereby the particle separation size may be adjusted as desired to suit the materials to be separated, whereby the loading of the separated materials onto the conveyor belt below the device can be efficiently regulated so as to reduce belt damage and wear.

Another object is to provide a positive and versatile tandem-driving-means for a plurality of rotatable bar elements wherein the drive structure of each of the bar elements may be identical for convenience and economy in manufacture, and wherein the relative spacing of the bar elements may be increased or decreased in relatively short increments so as to permit adjustment and control of a materials separation operation without the need for expensive mechanical changes.

Another object is to provide an adequate lubrication system for all moving parts of the mechanism.

These and other objects and advantages of my invention will become more apparent as the description proceeds.

According to this invention, particle separation is accomplished by means of a set of transverse bars, each having an elliptical cross-section with the major axes of alternate bars displaced by ninety degrees so that when rotated in unison, the predetermined space between bars remains constant. This separator is combined with a hopper arranged so that the major portion of the separator is heavily burdened with materials as long as the hopper contains such materials. The separator operates as its own self-feeder, drawing materials from the hopper as rapidly as the capacity of the separator dictates. As the bars rotate, fine materials pass between the spaces between bars, and materials too large to pass these spaces travel longitudinally across the bars and are discharged over the edge of the last bar.

The invention is shown in detail in the drawings forming a part of this description and wherein:

Figure 3 is a top plan view of the bed of the separating unit.

Figure 4 is a vertical sectional view through the drive end of the device shown in Figure 3.

Figure 5 is a vertical sectional view on the line 5—5, Figure 3, showing details of the construction of the driven end of the separator bars.

Figure 6 is a similar view on the line 6—6, Figure 3, showing details of the non-driven end of the separator bars.

Figure 7 is a perspective view of one of the bearing blocks in which the rotating bars are carried.

Figure 8 is a perspective view of a chain hold-down device.

Figure 1:
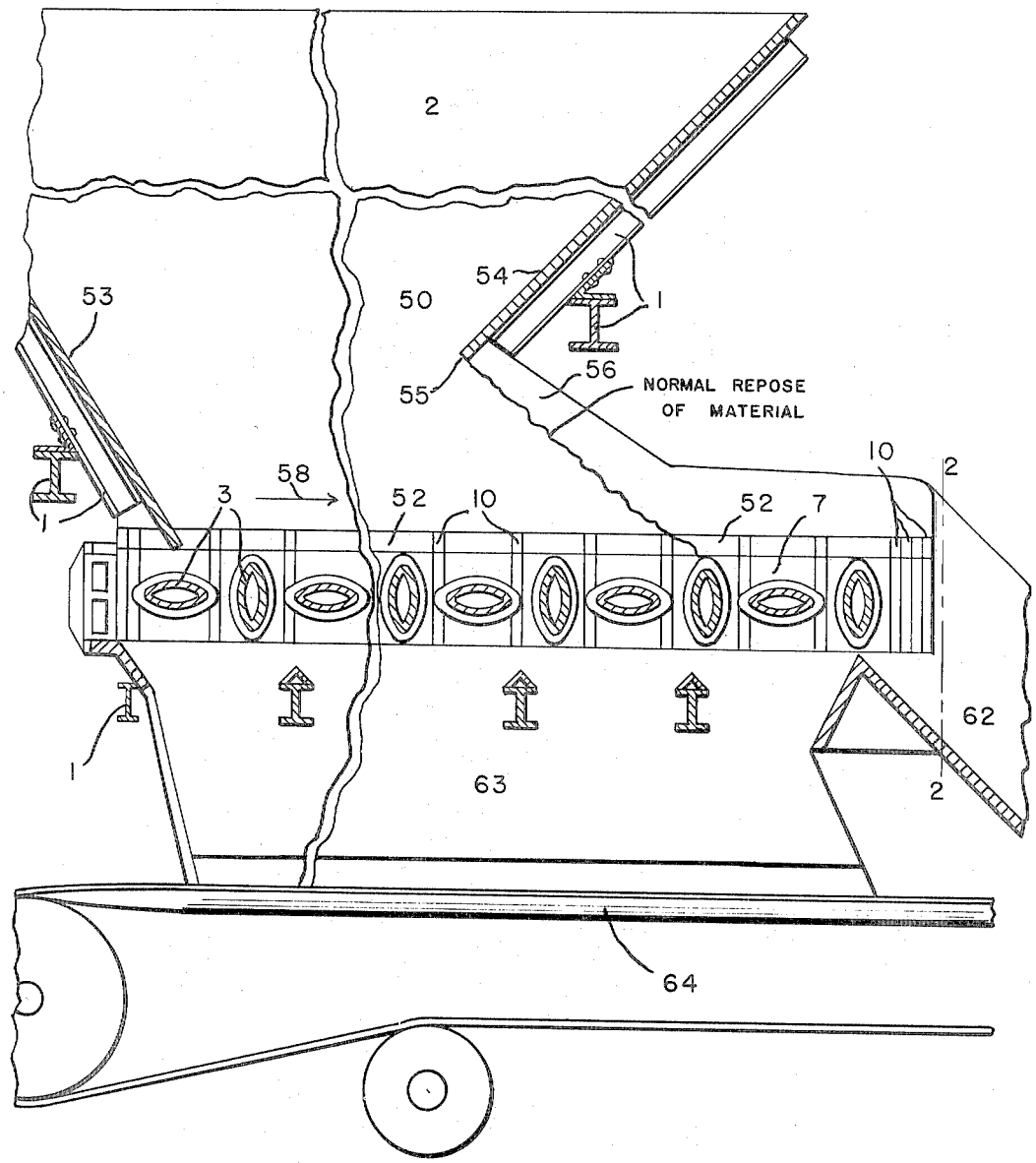
Figure 1 is a fragmental, broken, vertical, sectional view through a materials separating installation showing the invention.
Figure 2:
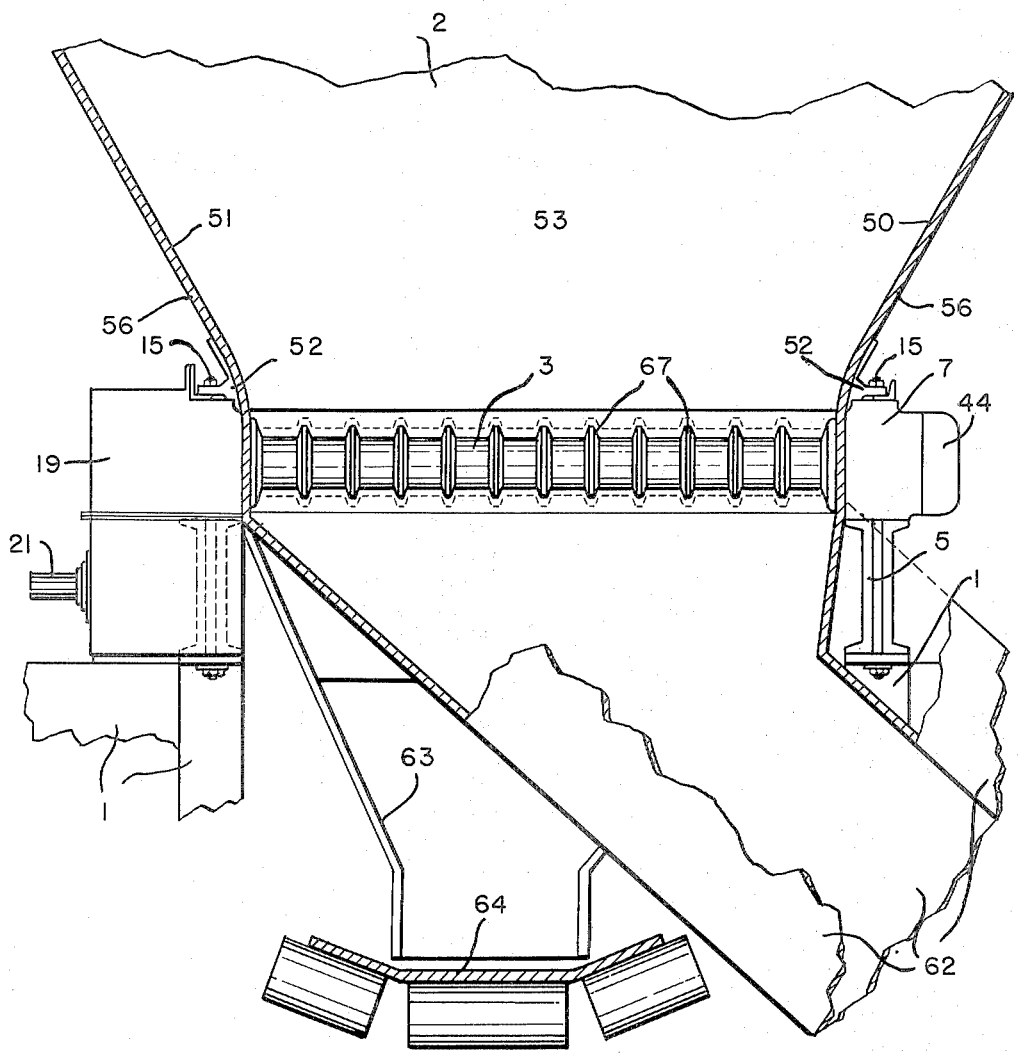
Figure 2 is a sectional view on the line 2—2, Figure 1, showing the discharge end of the installation.

For the sake of convenience in this description, the materials to be separated shall be hereinafter referred to as ore, it being understood that the term ore includes earth, clay, rock and ore.

In the drawings, the reference numeral 1 indicates the supporting structure of framework of an ore separating plant, and 2 indicates a receiving hopper in which the ores to be separated are dumped, usually from a truck. The hopper 2 may be of any desired capacity; however, it is preferred that the hopper have at least enough capacity to hold the full loads of two or more of the trucks or other conveyances used to haul material thereto so that hauling equipment may be run at full capacity and not have to wait for minor delays which may occur in the separation plants, as, for example, during a power failure.

*Ore separating device*

As the bottom of the hopper 2, I have provided an ore separating device comprising plurality of bars or rolls 3—3, said bars being preferably manganese steel units arranged in spaced parallel relation to each other, and being of elliptical cross-section, as shown. Adjacent bars are arranged with their major axes displaced 90 degrees. In other words, adjacent bars are arranged with their longitudinal axes in the same plane but with their transverse major axes substantially perpendicular to one another. Each of the bars 3 is mounted at each end thereof in a bearing 4 so as to be rotatable on its longitudinal axis, and means is provided to rotate the bars simultaneously in the same direction whereby the aforesaid relation of the major and minor axes thereof and the spacing of the bars remains constant throughout their rotation. This rotating means will be disclosed as the description proceeds.

The ore separating device is preferably mounted in the supporting structure 1 on a suitable frame 5 made up of oppositely disposed, spaced channel irons 6—6, as shown, which may be securely fastened in place in the supporting structure in any desired manner, either in horizontal position, as shown in Figure 1, or at an upward inclination with respect to the horizontal.

As shown in Figures 5 and 6, each of the bars 3 has a separate but similar bearing element or block, 7 and 8 respectively, on each end thereof in which the bearing 4 is seated, the bearing blocks 7 being all identical, and the blocks 8 being identical whereby they may be assembled in side-by-side relationship on each side of the frame 5, as shown, and provide a uniform assembly of bars and bearing blocks on the frame 5. The bearing blocks are preferably rectangular in shape, and have a spherically concaved bearing seat 9 to receive the spherically convex bearing 4 whereby the alinement of the bars 3 and bearing blocks is not extremely critical.

A plurality of spacer elements 10 are provided, a predetermined number of which form a part of the unit or assembly which has a fixed length. The spacers may be inserted between the bearing blocks 7 or 8 when the latter are assembled to space said blocks apart a predetermined distance, thereby increasing the spacing between adjacent bars 3 a distance equal to the thickness of the spacers 10.

If desired, the bars may be mounted so that they are closely adjacent each other when all of the spacers are assembled at one end of the separating device. Or one or more of the spacers may be inserted between each of the blocks 7 and each of the blocks 8 when they are assembled to provide any desired spacing between the peripheries of the bars, as required by the type of ore being handled, or by the need required for the further processing of the ore. In Figure 3, the bars are shown closely adjacent each other at one end and being spaced a progressively increasing distance apart toward the other end to illustrate this feature, the further advantages of which will become apparent as the description proceeds.

When the desired spacing of the bars 3 has been established and the blocks and spacers are in position, the entire assembly of blocks 7 on the one side of the frame is clamped together longitudinally by means of clamp-bars 11—11, which extend the entire length of the block assembly adjacent the upper and lower ends thereof and have a threaded end on which nuts 12 are tightened to draw the blocks together longitudinally in a rigid closed assembly. Likewise, the blocks 8 are clamped together by clamp rods 13 and nuts 14. The clamped block assemblies are then secured to the frame 5 by means of bolts 15—15 which extend through suitable openings (not shown) provided in or between the blocks 7, and between the spaced channels 6—6, as shown. The bolts 15 are tightened securely to clamp the blocks firmly on the frame. It is preferred, of course, that the upper surface of the frame 5 be machined or planed so that the blocks will lie in alinement thereon.

The spacing between the bars 3 may be changed by the simple expedient of removing the clamping devices and re-arranging the spacers and blocks. The overall length of the assembly will remain constant irrespective of the space between adjacent bars as long as the total number of blocks and spacers on each side of the machine are not changed.

Drive mechanism

The ends of the bars 3 which are supported in the bearing blocks 8 are provided with an extension 16 on which sprockets 17 are mounted, all of the sprockets being alined longitudinally so that the upper portion of their peripheries will engage a drive chain 18, which is, in this instance, a two-strand roller chain, see Figure 4. Within the lower portion of the gear case 19, which is carried on the frame 5, a drive sprocket 20 is rotatably mounted, preferably below the sprockets 17, and in alinement therewith. The sprocket 20 is carried on the drive shaft 21 which extends externally of the case 19, as shown, the shaft 21 being rotatably supported in suitable journals 22—22, one on each side of the drive sprocket 20. The drive shaft 21 is preferably coupled to a motor, not shown, through a conventional speed reducer, not shown, to obtain the desired drive speed and power to rotate the bars 3.

In order to make the chain drive more positive, chain hold-downs 23 secured to the bearing blocks 8 have been provided, preferably on each side of, and adjacent the peripheries of each of the sprockets 17, the hold-downs having depending lugs, as shown, which the rollers only of the chain 18 engage as the chain is rotated, thereby reducing the wear on the chain and the hold-down means by providing a rolling engagement.

The casing 19 preferably has a quantity of oil in the bottom thereof through which the chain 18 runs, whereby the chain is lubricated.

Means are provided for adjusting the tension of the drive chain 18 comprising an idler sprocket 24 freely rotatably mounted on a stub shaft 25 which is mounted in offset or eccentric relation on a smaller stub shaft 26 which is carried in a suitable bearing, not shown, affixed to the gear case. The take-up sprocket is preferably mounted on the side opposite the drive effort of the drive pulley. Because it is contemplated that the bars 3 may be rotated in either direction, if desired, the take-up sprocket and mounting are designed to withstand the driving pull of the chain. There is provided, however, a bearing 27 on the opposite side of the drive pulley 20 so that the take-up sprocket and shafts may be moved to the opposite side of the drive sprocket if the direction of rotation is reversed, the stub shaft 26 being then carried in the bearing 27 in the same manner as heretofore described.

As means to adjust the chain tension, a crank arm 28 extends externally of the casing from the shaft 25 to permit adjustment of the eccentric without entering the casing.

It will readily be seen, from the above, that the bars 3 will be rotated simultaneously in the same direction, all at the same speed, when driving effort is applied to the drive shaft 21.

To provide for transverse stability for the ore separating assembly, each of the bars 3 has a hollow, cored-out center portion 29'. Axially through each of the hollow bars extends a tubular shaft 29 on one end of which is threaded a disc-like end member 30 which engages the outer face of the sprocket 17, see Figure 5. The opposite end of the shaft 29 has a disc-like member 31 thereon which engages the adjacent end of the bar 3. A pair of nuts 32 are provided on the shaft 29 to permit the sprocket and bearing assemblies to be clamped together transversely of the device. The shaft 29 and members 30 and 31 rotate with the bars when they are driven.

Lubrication

It is, as above set forth, one of the objects of the invention to provide a device which may be adequately lubricated at all times and means to accomplish this lubrication. This means preferably comprises a conventional oil pump, not shown, which pumps oil continuously from the oil sump in the bottom of the gear case 19 through a main oil supply line 33 which runs along the length of the device within the casing 19. Preferably, the line 33 is aligned with the rotating axes of the bars 3, as seen in Figure 5, and has a coupling 34 opposite the axis of each bar, whereby a secondary supply line 35 may be connected thereto to extend through the tube 29 from one end thereof to the other. An oil feeder line 40 is connected at the remote end of each of the secondary supply lines by means of a suitable coupling 41, the feeder line having a connection to a channel 42 in the bearing block 7 which leads to the oil feeding opening 43 in the bearing 4, the oil feeding opening preferably being enlarged laterally adjacent the bearing to supply adequate lubricating for the bearings. Excess oil will leak out of the bearings and build up in the cap 44 which is installed on the outer end of each of the bearing blocks 7, as shown, to retain the oil and prevent the mechanism from accumulating dirt. An oil seal 45 is installed on the inner end of each of the bearing blocks 7 to prevent oil from escaping along the inner face of the blocks 7 and along the connection between the bars and the bearing blocks. The portion 46 of the bars 3 against which the seals 45 are engaged are circular in cross-section.

As stated above, oil is pumped continuously to the bearings 4 and builds up in the cap 44. The oil builds up to the level of the hollow shaft 29, and then runs back through the shaft and drains into the oil sump in the bottom of the gear case for re-use. It is to be understood that the shaft 29 rotates with the bars 3; however, the oil supply line and its appurtenances do not rotate but are stationary; therefore, the oil draining back through the shaft 29 provides for a lubricated mounting for the oil supply line 35.

At the drive end of the bars, the bearings 4 are similarly lubricated by a feeder line 36 which has a connection to the oil channel and feeder opening 47. An oil seal 48 is provided on the inner end of the bearing block 8, which is engaged against a cylindrical portion 49 on the drive end of the bars 3, as shown, whereby excess oil drains directly into the oil sump from the drive end bearings. Thus, all moving parts are adequately lubricated continuously for smooth and extended operation. An oiling system as herein provided requires very little attention, as all that is required is to maintain the proper oil level in the oil sump. A full complement of bearing blocks, plus their spacers, regardless of their arrangement, provides a continuous oil-tight surface, of a constant length, to form one wall of the lubrication case 19, as shown. The bars may be respaced at will without affecting the oil tightness of the unit.

*Operation*

As seen in the drawings, the separating device is installed as the bottom of the hopper 2 into which ore is dumped, usually by truck, mine skip, or the like. The hopper 2, as stated, preferably has a capacity to hold at least several truck loads of material and has a wide, open upper end to facilitate dumping thereinto. The side walls 50 of the hopper converge toward the bottom thereof and engage and preferably connect with inclined side skirts or wear plates 52 which are bolted to the bearing blocks 7 and 8 along the upper ends thereof, as shown, to provide a tight and leak-proof unit. The wear plates are preferably of manganese steel so as to most readily resist abrasive wear, and because they are bolted in place, they may be readily removed and replaced when worn. The rear end wall 53 of the device is joined with the adjacent edges of the side walls and may converge toward the rear end of the separating device, as shown, and preferably has its lower end directly above the axis of the rearmost bar 3, as shown, to prevent ore from being caught or jammed in the rear end of the device. The front end walls 54 of the hopper 2 may converge toward the bed of the separating device; however, the lower end 55 of the end wall 54 is shown as being cut off at a considerable height above the bed of the device. The side walls have forwardly extending portions 56 extending from the bottom of the front wall to the forward or discharge end of the separating bed, as shown, the purpose of which will become apparent.

When a load of ore is dumped into the hopper, it drops to the bottom thereof, onto the bed of rotatable bars 3, being confined thereon by the rear and side walls of the hopper. The lower edge of the front wall serves to limit the distance or extent to which ore can spill forwardly on the bed of the separating device, as the ore will assume its natural angle of repose and will extend beyond the end 55 of the front wall a predetermined distance only. The forwardly extending portions 56 of the side walls serve to confine the forward spillage to the separator bed.

As is apparent from the drawings, the hopper provides means to confine the ore to be separated over the major portion of the bed of the separator to a considerable forwardly tapering depth. The bar elements 3 are, as stated, very strong and rigid and are capable of withstanding the shock of ore being dumped onto them, and also to carry the entire weight of the ore in the hopper. During continuous operation, however, ore usually will not be dumped directly onto the bar elements, as a quantity of ore will be left in the hopper to absorb dumping shocks.

With ore confined on a substantial portion of the separator bed, and the bar elements being driven or rotated as above described, the ore separating operation takes place. In order to obtain the fullest understanding of the action which occurs during the operation, it must be realized that the entire body of ore carried on the bed is involved in the operation, and individual particles can not be considered as separate entities. That is, each of the particles of ore which is in engagement with the bars 3 must be considered as having, or bearing, a substantial burden, the weight of the material above the particles providing this burden or weight. This feature of the invention differs materially from any other separating means known, and therefore it is desired that particular attention be called thereto.

For purposes of illustration, I have shown in Figures 9 to 13 the path taken by one particle 57 of ore which is too large to pass between the spaced bars 3 when the bars are rotated in the direction of the arrows. It is to be understood, of course, that the particle is assumed to be under a heavy burden of ore on the separating bed with particles before, behind, and above the particle illustrated. It is also to be assumed that all small sized particles will pass through the spaces between the bars 3 as the ore body in the hopper moves downwardly and that only large particles will remain on the bed to be moved laterally to a common collecting point below the chute 62.

All of the bars 3 rotate in the same direction, as stated; therefore, all upper surfaces are moving in substantially the same direction, as indicated by the arrow 58. These upper or contact surfaces of the bars 3 are in contact with the ore particle, and therefore, there is an effort present urging the ore to move across the bed in the direction of the arrows.

However, there also is a gravitation effort present tending to move the particle downwardly, through the spaces between the bars 3, which effort may be greater than the lateral moving effort, depending on the ratio of oversize to undersize material. Therefore, there are efforts present tending to move the ore body in two directions simultaneously, and the resultant of these efforts is a downward declination, which declination represents the path of travel of the center of mass of material across and through the separator.

Figure 9:
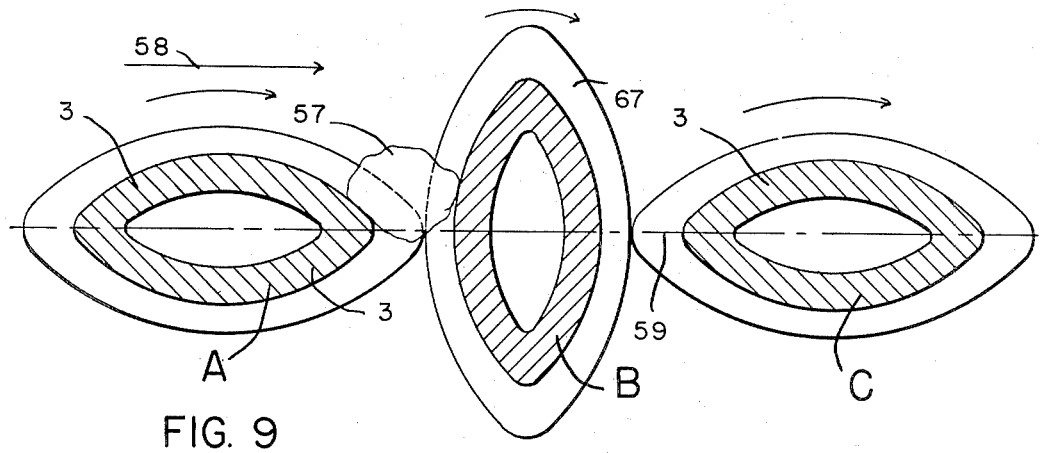
Figures 9–13 are successive views showing the progress of a single large particle along the separator bed.

By referring to Figure 9, it may be seen that the large particle of ore 57 is resting over the space between bar elements A and B, it being remembered that this particle is being subjected to the aforesaid burden of the mass of materials surrounding it. The elements A and B rotate, as indicated by arrows, in the same direction, and cause the particle 57 to rotate at a speed proportionate to the peripheries it engages. As the elements A and B rotate 45° to the position shown in Figure 10, the particle remains between the elements A and B and moves downwardly slightly, still rotating so as to minimize grinding or crushing action. It is to be noted here that while one end of each of the bar elements is moving downwardly, the opposite end thereof is moving upwardly, but the ore mass above the elements is not undulated by the rotation of the elements 3. Actually, there is equal displacement of the bars into the ore mass no matter what their degree of rotation is, as may clearly be seen in Figures 9–13, where the line 59 indicates the center line of the bars, thus showing clearly that the portion of the bars above the center line at any instant remains constant irrespective of their rotation. That is to say that the particles which are moved downwardly as one side of the bar moves in that direction merely make way for the particles engaged by the upwardly moving side of the bar to move laterally and downwardly into the position vacated by the particles on the downwardly moving side.

Figure 11:
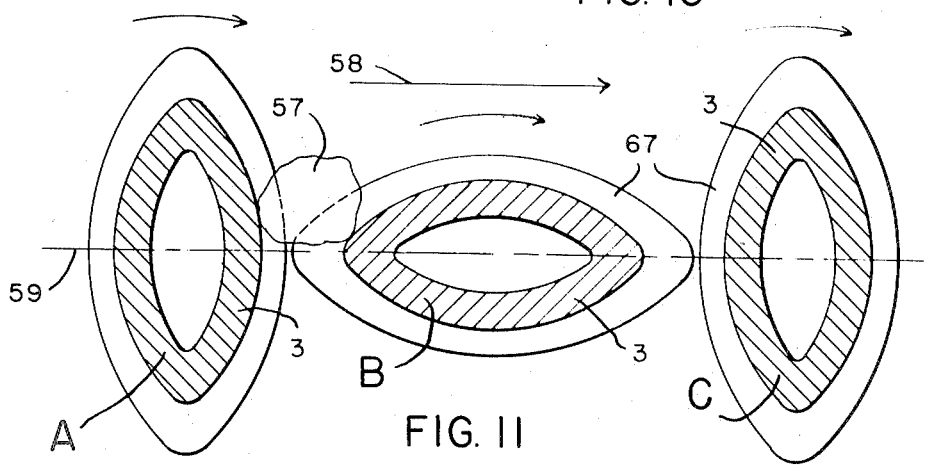
Figure 12:
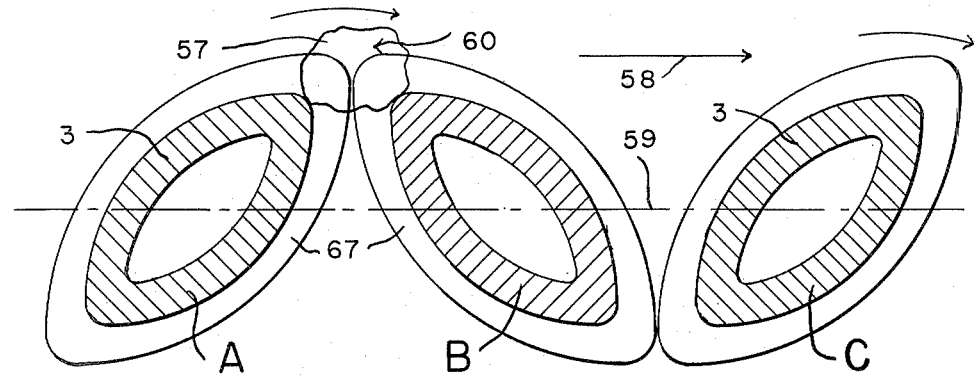
Figure 13:
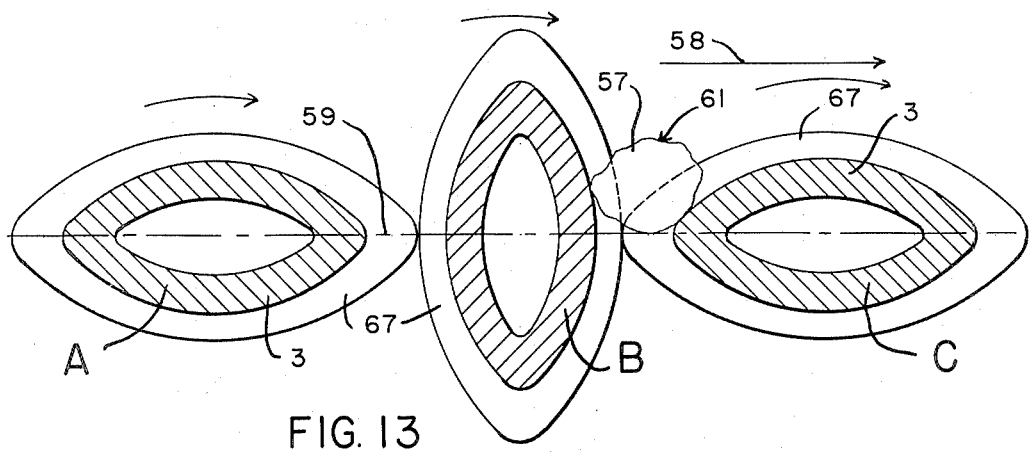

As the bars rotate another 45° to the position shown in Figure 11, the particle 57 moves to the position shown and is caused by further rotation to be raised and moved laterally by the cooperative lifting action of the element B and the pushing action of the element A and the mass surrounding the particle until it reaches the position 60 shown in Figure 12. The continued rotation of the bars and the lateral pushing on the particle 57 by the mass cause the particle to move laterally and downwardly to the position shown at 61, Figure 13, which is the same relative position with respect to elements B and C as is shown in Figure 9 in regard to elements A and B.

Figure 10:
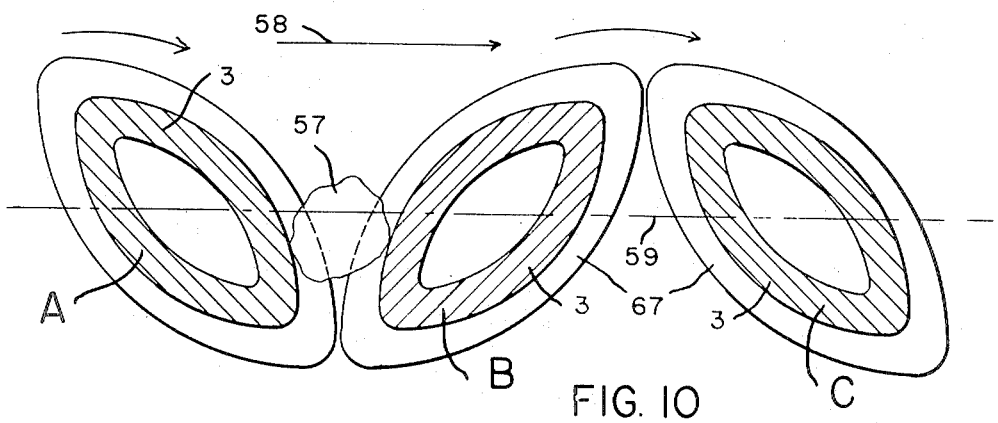

It is to be understood that unless there was a burden on the contact surface or bed of the separating device, the particle would not move laterally; it will merely move up and down in the notch between two of the bar elements 3, for example, from the position shown in Figure 10 to that shown at 60 in Figure 12 and back to the position shown in Figure 10. The only particles that can move over the bed when no burden is on them are those extremely large particles which span and engage at least two similarly disposed bars 3 simultaneously. This action renders the device non-self-clearing; that is, when the supply of materials is interrupted and the burden on the bed no longer exists, particles too large to pass the spaces between bars remain on the bed. When the supply of material is resumed and the burden reestablished thereby, said particles will pass laterally across the bed and be discharged over the last bar.

The particles which are too large to pass between the spaced bars 3 are moved across the bed of the separating device to one end thereof where they drop into a chute 62, or other collecting device, from which they may be directed into a suitable crusher or into a separate hopper for removal by truck or the like. The bars 3 preferably have spaced peripheral ribs 67 to prevent large but thin particles from going through the bed, forcing them to move across the bed. These ribs preferably have substantially straight sides, which rib profile provides for maximum operating efficiency of the elliptical bars.

The small particles which pass through the bed of the device are collected in a hopper 63 having walls which embrace the outer edges of the separating device at their upper ends, and which converge to a narrow lower end. The bottom of the hopper 63 may have any suitable closure device, not shown, which may be opened to release the ore therefrom as and when desired, or, a conveyor belt 64 may be mounted thereunder, as shown, whereby the ore is collected continuously and transported by the belt to any desired unloading or collecting point, not shown.

Provision has been made to adjust the relative spacing between adjacent bars 3 by inserting a spacer or spacers 10 between adjacent bearing blocks to regulate or control the separation process and to meet varied conditions and requirements which may be encountered in mining operations. It would be relatively simple to vary the spacing between the bars 3 in increments equal to one chain pitch; however, the device here shown is a heavy duty type and the drive chain 18 is a heavy duty type. In such a heavy duty device, the chain pitch may be too long to provide an increment of adjustment which would provide the desired fineness of separation; that is, the bars if spaced in their minimum spaced relation may be too close together; yet, if the spacing were increased, a distance equal to one chain pitch, they may be too far apart to provide the desired degree of separation.

Because the relative rotative position of the bars 3 is critical, the timing of the device becomes a problem when varying spacing is desired in increments which are shorter than the pitch of the drive chain.

Also, it is desirable to provide identical units, insofar as possible, in a given structure to keep down manufacturing costs, and to permit various units to be interchangeable. All of the blocks 7, blocks 8, bearings 4, bars 3, and sprockets 17 are therefore identical. In addition, all of the sprockets 17 are keyed in exactly the same position on each of the bars. As here shown, the keys 75 are placed directly in radial alinement with a tooth space 76 on each of the bars 3, and the keys are on the minor axes of the bars. Center distance between adjacent bars has been set at one-fourth of a chain pitch more or less than an even number of chain pitches.

Figure 14:
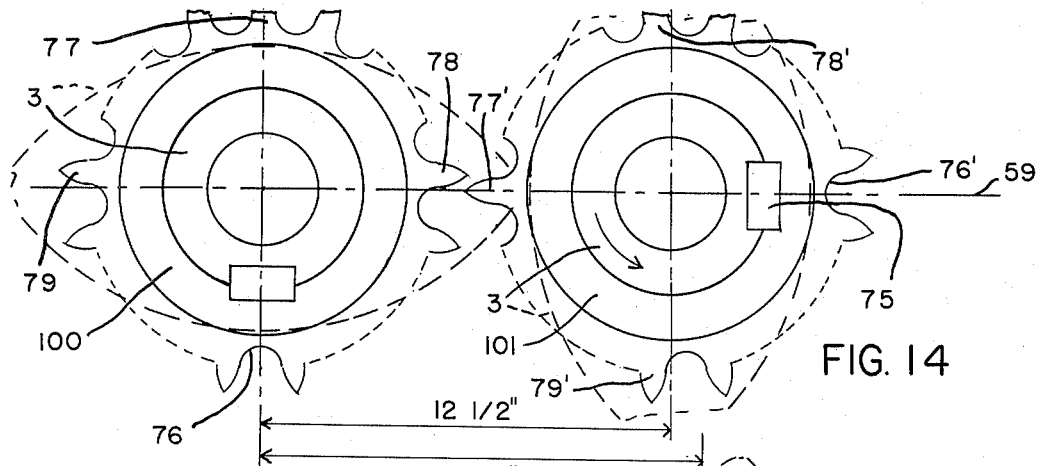
Figures 14–16 are views illustrating the chain drive sprocket construction and the relative mounting of two adjacent bar elements whereby timing may be maintained when the distance between bar centers is varied.
Figure 15:
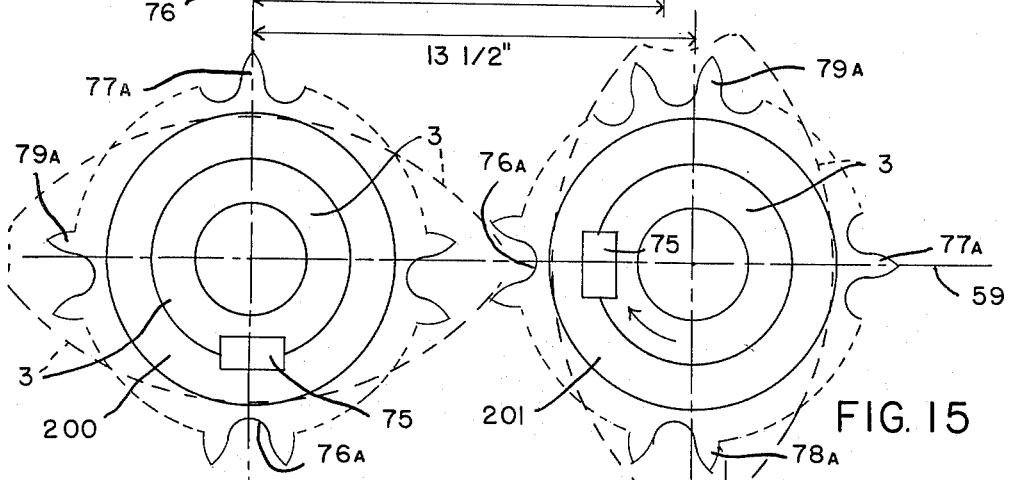
Figure 16:
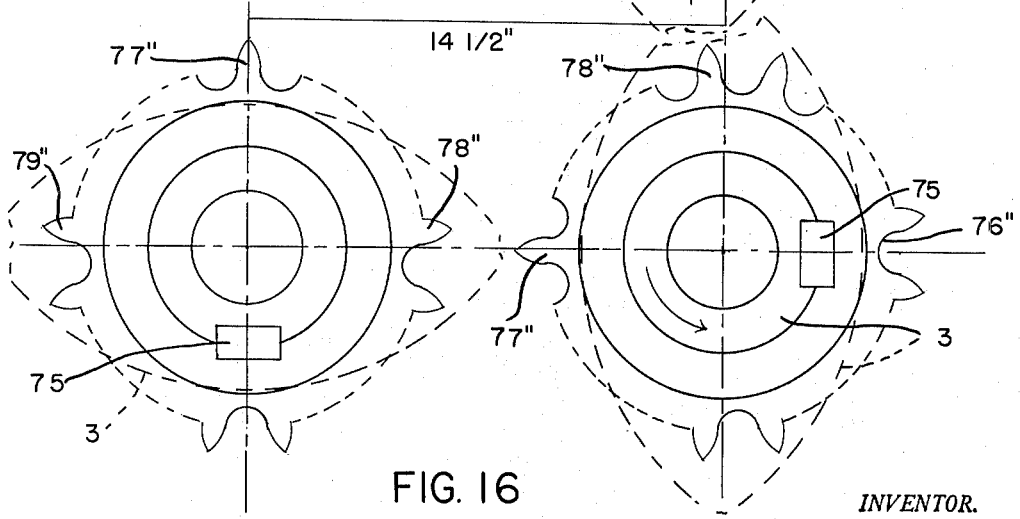

For purposes of understanding, in Figures 14-16, there is set forth a specific illustration of means for varying the spacing between adjacent bars in increments of one-half the length of the drive chain pitch. In this example, a two inch chain pitch; one inch increment of adjustment; and 12½, 13½, and 14½ inches between bar centers have been illustrated. The bar elements 3 have a major axis of 11½ inches and a 6½ inch minor axis, making the spacing between the bars 3½ inches when the bars are on 12½ inch centers, 4½ inches when the bars are on 13½ inch centers, and 5½ inches when the bars are on 14½ inch centers, it being remembered that adjacent bars have their major axes at right angles to each other.

To accomplish this adjustment, the sprockets have an odd number of teeth (for example, 17) because in a 90 degree rotation, the sprockets will move a number of pitches plus or minus one-fourth of a tooth; in a seventeen tooth sprocket this will be 4¼ teeth. Thus, as seen in Figure 14, the sprocket 100 may be set with the tooth 77 which is opposite the space 76 and key 75 on the vertical centerline of the sprocket 100 and bar 3 where the chain will drivingly engage same. When the adjacent sprocket 101 is rotated 90 degrees counterclockwise to place the major axes of the adjacent bars at right angles as required, the key 75 and the tooth space 76' of the sprocket 101, as well as the tooth 77', are on the horizontal center line of the bar 3 and sprocket 101. The tooth 78' is then in the uppermost position on the sprocket where the chain 17 can drivingly engage same. However, the tooth 78' is one-fourth chain pitch or one-half inch off the vertical centerline of the sprocket 101 in the direction of the sprocket 100, as the sprocket has moved 4¼ teeth in its 90 degree rotation. This places the tooth 77 of sprocket 100 and the tooth 78' of the sprocket 101 exactly an even number of chain pitches, or twelve inches (six two-inch pitches) apart, whereby timed rotation of the adjacent bars is maintained.

It is deemed apparent that the bar and sprocket not shown on the opposite side of the sprocket 101 will be placed 90 degrees counter-clockwise with respect to sprocket 101, etc. In other words, every fourth bar and sprocket will be similarly disposed when the bars are evenly spaced apart.

If it is desired to increase the distance between adjacent bars an even chain pitch, or two inches, to 14½ inches between centers, as seen in Figure 16, this is easily accomplished by placing two one-inch spacers 10 between the bearing blocks which mount the adjacent bars, and adding one chain pitch. The same 90 degree counter-clockwise rotation of adjacent bars and sprockets is used to time the mechanism, as shown in both Figures 14 and 16, it being noted that the teeth 77" and 78" are in the same relative positions as the teeth 77—77' and 78—78'.

However, it is desired to increase or decrease the spacing between adjacent bars by lesser increments, such as one inch. This is shown in Figure 15 where sprocket 200 is set with its key 75 and upper tooth 77a on the vertical centerline of the bar and sprocket. The adjacent sprocket 201 is rotated 90 degrees to bring the major axis of its bar 3 at right angles to the major axis of the bar 3 of the sprocket 200; however, the sprocket 201 and its bar 3 are rotated clockwise, placing the tooth 77a on the horizontal center line of the sprocket in the direction away from the sprocket 200, placing tooth 79a, which corresponds to teeth 79, 79' and 79" in Figures 14 and 16, into the upper or drive position. The tooth 79a is one-fourth pitch or one-half inch off the vertical centerline of the bar and sprocket 201 in the direction away from the sprocket 200, the opposite of the condition shown in Figures 14 and 16. However, this places the tooth one-half inch beyond the centerline of the sprocket 201, and this one-half inch, when added to the 13½ inch distance between the centers of sprockets 200 and 201, makes an even seven pitches or fourteen inches, providing for perfectly timed operation of the bars irrespective of the relative spacing between adjacent bars. As in the example of Figure 14, each adjacent bar and sprocket is 90 degrees out of phase, but every fourth bar and sprocket are similarly disposed when the bars are evenly spaced apart.

If desired, 15½ inch centers between adjacent bars may be obtained by adding two spacers 10 and one chain pitch to the arrangement shown in Figure 15.

It is deemed apparent that by using combinations of the clockwise and counter-clockwise rotation of adjacent bars and sprockets, any desired spacing between adjacent bars may be obtained. For example, in Figure 3, the spacing of the bars is gradually increased from the rear to the front or discharge end of the bed of the separator to accomplish a specific controlled separating action, yet the bars 3 are maintained in timed rotation even with a drive chain having a pitch longer than the increments of bar spacing.

As shown in Figure 3, the spacing of the bars is at a minimum at the rear end of the bed, whereby the ribs run closely adjacent each other, thus providing for the depositing of the finest materials on the conveyor belt (shown in Figure 1) first, as the direction of travel of the conveyor is from the rear to the front of the bed. The spacing of the bars is progressively increased in predetermined increments from the rear to the front of the device, whereby the materials which pass through the bed are collected on the conveyor in progressively increasing sizes; that is, the fines or smallest particles are collected first on the belt, and the larger particles drop on top of the fines. This method of spacing and operating the bars provides an improved method of loading a conveyor belt, whereby the belt is less subject to damage from large particles dropping on same, and is also less subject to abrasion or scuffing by these particles as they are accelerated to the speed of the belt, as the fines form a cushion on the belt, and also aid in the acceleration of the large particles to the speed of the belt travel without permitting the large particles to directly engage the belt. Thus, belt life is increased materially, a major consideration in conveyor belt installations.

Another feature of my invention is that the rotative speed of the bars may be varied by means of a variable speed drive, not shown, to govern the separating and/or feeding action of the unit to achieve a continuously uniform flow of material through and/or over the unit.

It will be apparent, from the above, that the instant separating means may operate at full capacity when there is material in the hopper 2, and that the separator may readily be designed and operated to accommodate any desired work capacity to suit particular problems of individual separating operations. The capacity of the units may be increased or decreased by varying either the length of the individual bars (that is, the width of the bed) or the length of the bed. The latter adjustment would merely involve adding more bars 3 and making the hopper proportionately longer on the extended end of the separator bed.

In the instant device, there is no problem of feeding at a uniform flow, and there is no necessity for metering the feed to the device to accommodate surges of ore which would otherwise pass over the separator unprocessed.

In addition, the instant separator does not require a considerable head space as is necessary in the case of grizzlies and screens which must be placed at a declination for ores to be waterfalled thereover. In fact, the instant separating unit may be operated at an inclination or upward angle respecting the direction of movement of material along its bed, whereby the separating bed has its large-particle discharge end at a higher elevation than its rearmost end. Inclinations of up to ten degrees or fifteen degrees are practical for the instant device to be operated with efficiency. In fact, when operated at an upward angle, the smaller particles may be more thoroughly removed from the ore in the hopper, as the large particles will be rolled around more frequently to unload the small particles which may be lodged thereon. Obviously, by operating the unit in this manner, less head space is required.

The foregoing detailed description has been given for clearness of understanding only, and no unnecessary limitations should be understood therefrom, and the appended claims should be construed as broadly as permissible in view of the prior art.

Having thus described my invention, what I claim is:

1. A device for separating coarse from finer material comprising a plurality of bearings, means mounting said bearings in two spaced substantially parallel units with said bearings in spaced, oppositely disposed pairs, a plurality of spaced transverse rolls mounted between each of said pairs of bearings forming a bed, said rolls having an approximately elliptical cross-section, adjacent rolls having their major axes approximately ninety degrees out of phase with each other, means for rotating said rolls simultaneously in one direction and at the same speed to maintain substantially the same opening between adjacent rolls, said bed being so disposed that it is not self-cleaning in the event a burden of material is not present thereon, coarse material remaining on the bed in the latter event, wall means for retaining a heavy burden of coarse and finer materials over the major portion of said bed, and said wall means having an opening therein whereby the coarse material which cannot pass between the rolls is fed in the direction of rotation of said rolls over the end of the bed.

2. A device for separating coarse from finer material comprising a plurality of bearings, means mounting said bearings in two spaced substantially parallel units with said bearings in spaced, oppositely disposed pairs, a plurality of spaced transverse rolls mounted between each of said pairs of bearings forming a bed, said rolls having an approximately elliptical cross-section, adjacent rolls having their major axes approximately ninety degrees out of phase with each other, a sprocket adjacent one end of each of said rolls, a chain engaging each of said sprockets, means to drive said chain to rotate said rolls simultaneously in the same direction and at the same speed to maintain substantially the same opening between adjacent rolls said bed being so disposed that it is not self-cleaning in the event a burden of material is not present thereon, coarse material remaining on the bed in the latter event, and wall means for retaining a heavy burden of coarse and finer materials over the major portion of said bed, said wall means having an opening therein on the end of said bed towards which said rolls rotate whereby the coarse material which cannot pass between the rolls is fed in the direction of rotation of said rolls out from said wall means and over the end of the bed.

3. In an apparatus for separating coarse from finer materials, a plurality of rolls arranged in spaced side-by-side substantially parallel relation to each other forming a bed, means rotatably mounting said rolls, said rolls having an approximately elliptical cross-section throughout their effective length, adjacent rolls having their major axes approximately perpendicular to each other, means to rotate said rolls simultaneously in the same direction whereby the distance between adjacent surfaces of said rolls remains substantially constant, said bed being so disposed that it is not self-cleaning when a burden is not present thereon, and wall means for retaining a deep bed of coarse and finer materials on the major portion of said bed, said wall means having an opening therein through which one end of said bed extends whereby finer materials are sifted through the spaces between said rolls and coarse materials are moved across and over said extending end of said bed in the direction of rotation of said rolls.

4. In an apparatus for separating coarse from finer materials, a plurality of rolls arranged in spaced side-by-side substantially parallel relation to each other forming a bed, means rotatably mounting said rolls, said rolls having an approximately elliptical cross-section throughout their effective length, adjacent rolls having their major axes approximately perpendicular to each other, means to rotate said rolls simultaneously in the same direction whereby the distance between adjacent surfaces of said rolls remains substantially constant, said bed being so disposed that it is not self-cleaning when a burden is not present thereon, means for retaining a deep bed of coarse and finer materials on the major portion of said bed whereby finer materials are sifted through the spaces between said rolls and coarse materials are moved across and over the end of said bed in the direction of rotation of said rolls, said retaining means including a pair of opposed walls extending upwardly from the side edges of said bed, and a partial wall connected with said opposed walls and extending transversely of said bed, said partial wall having its lower edge spaced above said bed to provide an open space, on the end of said bed toward which the upper surfaces of said rolls rotate, through which said coarse materials may move when carried along said bed.

5. A device for separating coarse from finer material comprising a plurality of bearings, means mounting said bearings in two spaced substantially parallel units with said bearings in spaced, oppositely disposed pairs, a plurality of spaced transverse rolls mounted between each of said pairs of bearings forming a bed, said rolls having an approximately elliptical cross-section, adjacent rolls having their major axes approximately ninety degrees out of phase with each other, means for rotating said rolls simultaneously in one direction and at the same speed to maintain substantially the same opening between adjacent rolls, said bed being so disposed that it is not self-cleaning in the event a burden of material is not present thereon, coarse material remaining on the bed in the latter event, and means for retaining a heavy burden of coarse and finer materials over the major portion of said bed whereby the coarse material which cannot pass between the rolls is fed in the direction of rotation of said rolls over the end of the bed, said retaining means including a pair of opposed walls extending upwardly from the side edges of said bed, and a partial wall connected with said opposed walls and extending transversely of said bed, said partial wall having its lower edge spaced above said bed to provide an open space, on the end of said bed toward which the upper surfaces of said rolls rotate, through which said coarse materials may move when carried along said bed.

6. In a materials separation device having a plurality of spaced, hollow bar elements rotatably supported at their ends in spaced bearing blocks, means to lubricate said bearings comprising: an oil sump, an oil supply line along one end of said elements adjacent said bearings, means to force oil from said sump through said supply lines, a secondary supply line leading from first said supply line through said hollow elements to the opposite end thereof, and a feeder line from said supply lines to said bearings, a cap member on said opposite end of said elements providing an oil reservoir to retain oil, the hollow portion of said bar elements serving as the oil return line from said opposite end to said sump when oil in said reservoir builds up to the lower level of said hollow portion.

7. In a materials separation device, a plurality of bar elements having an approximately elliptical cross-section, said bars being mounted to form a unitary bed of spaced substantially parallel bars, said bars having their major axes approximately perpendicular to each other, means for rotating said bars simultaneously in the same direction comprising a sprocket on one end of each of said bars and a drive chain engaging each of said sprockets, and means for adjusting the spacing between said bars, last said means including said sprockets having an odd number of teeth and being substantially identical, said sprockets being keyed to said bars in the same relative position with respect to their teeth and the major and minor axes of said bars whereby adjacent bars and sprockets must be rotated ninety degrees out of phase with each other to place said axes normal to each other, the direction of rotation of said bars being determined by the degree of spacing therebetween whereby said sprockets may be drivingly engaged by said chain.

8. In a materials separation device, a plurality of bar elements having an approximately elliptical cross-section, said bars being mounted to form a unitary bed of spaced substantially parallel bars, successive bars having their major axes approximately perpendicular to each other, means for rotating said bars simultaneously in the same direction comprising a sprocket on one end of each of said bars and a drive chain engaging a series of said sprockets, and means for adjusting the spacing between said bars: said sprockets having an odd number of teeth, being substantially identical and being keyed to said bars in the same relative position with respect to the major and minor axes of said bars whereby adjacent bars and sprockets must be jointly displaced ninety degrees out of phase with each other to place said axes normal to each other, the direction of displacement of adjacent bars causing a variation in relative tooth positioning whereby said sprockets may be drivingly engaged by said chain with a variation of spacing of the sprockets less than the spacing of the teeth on one sprocket.

9. In combination: a hopper, and a grill formed of a plurality of elongated members having a substantially elliptically shaped cross-section and arranged in spaced relation with their longitudinal axes parallel to each other, the major ellipse axes of adjacent ones of said members being oppositely disposed, said grill forming the bottom for said hopper, means for simultaneously rotating said members about their longitudinal axes with the upper portions all moving toward the discharge end of the grill to screen material from said hopper, said hopper being disposed over said grill so as to confine material on the receiving portion thereof, the hopper having a lateral opening therein through which said grill extends toward the discharge end thereof, the plane formed by the longitudinal axes having insufficient downward slope in said direction for rotation of the members to clean the grill of pieces too large to pass between the members, and said hopper and lateral opening each extending sufficiently high over said grill so that, when the hopper is filled, the grill will be so deeply loaded that pieces too large to pass between the members will be worked by them over the end of the grill in said direction.

10. The method of separating finer material from coarser material through the use of a bed of spaced parallel rolls of elliptical cross section driven in one direction with an approximately 90° phase separation between adjacent rolls, which comprises driving said rolls while maintaining the bed so nearly horizontal that rotation of the rolls will not clear the bed of pieces resting between the rolls, and loading that end of the bed away from which the tops of the rolls move with a mass so deep that rotation of the rolls will, while agitating the load to let finer pieces work down, move along the bed and over the other end thereof pieces too large to pass between the rolls.

References Cited in the file of this patent

UNITED STATES PATENTS

| | | |
|---|---|---|
| 471,268 | Edison | Mar. 22, 1892 |
| 530,262 | Distl et al. | Dec. 4, 1894 |
| 579,385 | Dodge | Mar. 23, 1897 |
| 617,197 | Smith | Jan. 3, 1899 |
| 984,487 | Parks | Feb. 14, 1911 |
| 1,002,967 | Cox | Sept. 12, 1911 |
| 1,446,312 | Mellin | Feb. 20, 1923 |
| 1,755,364 | Royer | Apr. 22, 1930 |
| 2,365,822 | Jones | Dec. 26, 1944 |

(Other references on following page)

FOREIGN PATENTS

| | | |
|---|---|---|
| 2,728 | Great Britain | of 1879 |
| 70,252 | Germany | July 3, 1892 |
| 354,709 | Great Britain | Aug. 10, 1931 |
| 603,341 | Germany | Sept. 13, 1934 |
| 618,154 | Germany | Aug. 15, 1935 |

OTHER REFERENCES

Taggart: Handbook of Ore Dressing, 1st edition, © 1927, page 522. (Copy in Division 55.)

Taggart: Handbook of Mineral Dressing, 1st edition, © 1927, page 1122. (Copy in Division 55.)